United States Patent Office 3,006,473
Patented Oct. 31, 1961

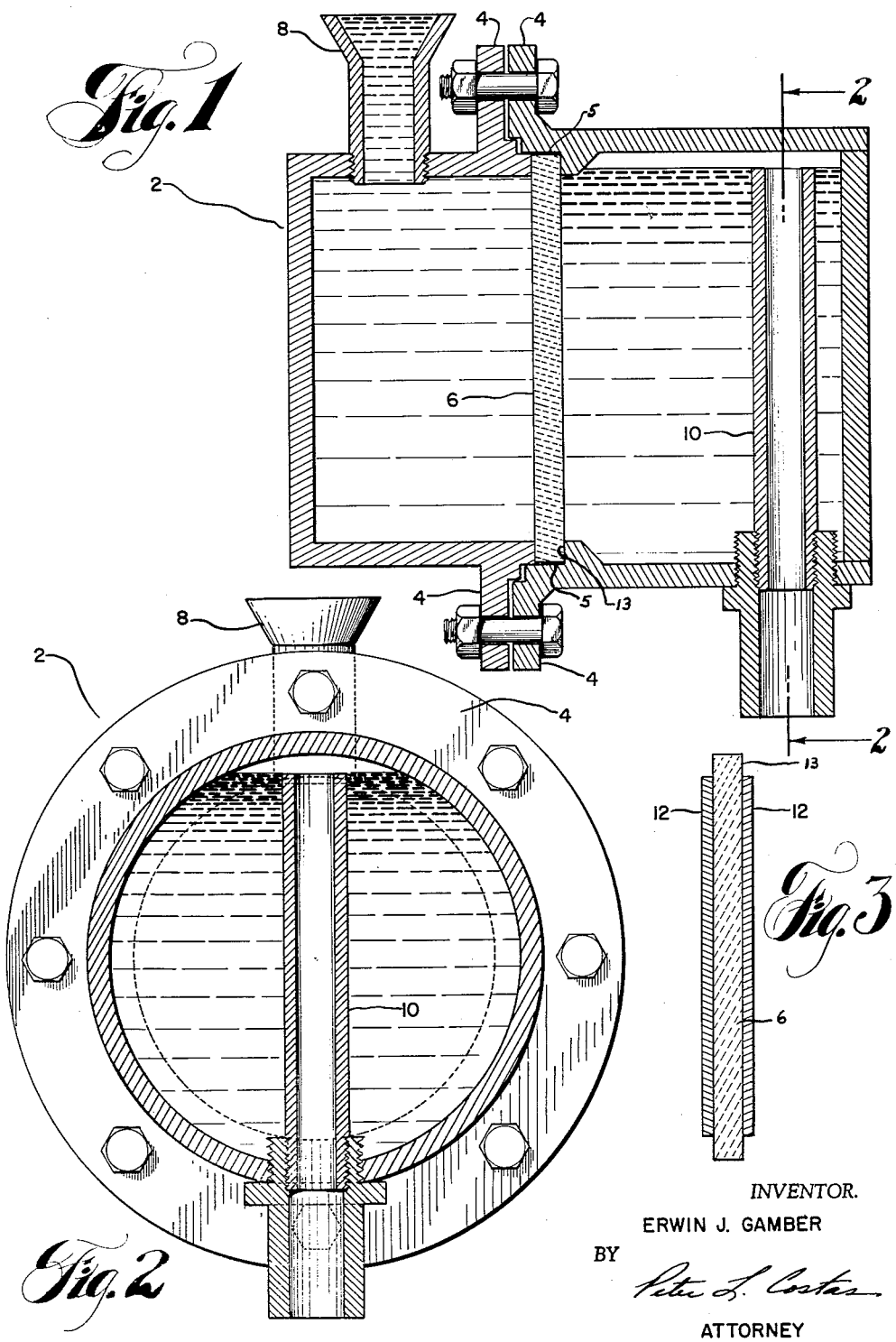

3,006,473
FILTERING OF MOLTEN ALUMINUM
Erwin J. Gamber, Cleveland, Ohio, assignor to Aluminum Company of America, Pittsburgh, Pa., a corporation of Pennsylvania
Filed Nov. 3, 1958, Ser. No. 771,275
6 Claims. (Cl. 210—69)

This invention relates to the filtering of molten aluminum to remove finely-divided solids therefrom, and more particularly to the use of a porous carbon filter in such a method.

The term "aluminum" as used herein refers to aluminum and aluminum base alloys containing at least 50 percent by weight of aluminum.

During the melting and handling of molten aluminum, a film generally forms on the surface of the molten metal which is largely composed of oxides of aluminum and/or its alloying constituents, and this film is broken up and dispersed within the molten metal as it is agitated in the course of melting, treating and transferring to a ladle or mold. In addition there may be particles derived from the skin on the solid metal charged to the furnace or melting pot or there may be particles of refractory material that have been detached from the furnace or transfer trough lining. In spite of care in fluxing and skimming the molten metal, some of the finely-divided non-metallic solids become entrapped in the solidified metal. Although such non-metallic impurities are harmless in some cast articles, they are objectionable in others, especially if they interfere with obtaining a fine finish or act as nuclei for the formation of gas-filled voids.

Filtering of molten metal has been proposed as a means of separating finely divided solid impurities suspended in the melt, beds of refractory material, compacted masses of loose filter material or screens being suggested for this purpose. It has also been suggested that a porous carbon body can be used as a filtering medium since it provides very small tortuous passageways that can entrap and retain the small suspended particles.

In practice, however, use of a porous carbon filter has presented difficulties because of the relatively low flow rates obtained, and the rapidity with which the filter becomes clogged, particularly in the absence of any externally applied pressure. In fact, even the application of pressure to the liquid does not overcome the clogging problem.

It is an object of this invention to provide a method of improving the filtering of molten aluminum through a porous carbon filter.

A particular object is to increase the initial flow rate and minimize clogging without loss in filter efficiency.

Another object is to provide a method for preparing a carbon filter plate for such filtration.

It is also an object to provide a porous carbon filter plate for use in the filtering of molten aluminum.

A further object is to maintain a high flow rate through the filter after the operation has started.

Other objects and advantages will be apparent from the following detailed description and claims, and the attached drawing wherein:

FIG. 1 is a side elevational section of a filtering chamber utilizing a porous carbon filter and adapted to the practice of the present invention;

FIG. 2 is an end elevational section along the line 2—2 of FIG. 1;

FIG. 3 is a side elevational section of an impregnated porous carbon filter with protective aluminum pads cast upon its surfaces.

As stated previously, attempts at utilizing porous carbon filters have been unsuccessful even though external pressures were applied to the metal being forced through the filter.

It has now been found that the previous difficulties may be overcome so that porous carbon filter plates may be utilized under commercial operating conditions for the filtration of molten aluminum by a method in which the carbon filter plate is prepared prior to insertion in the filtering device by first impregnating it with molten aluminum and upon completion of the impregnation immediately casting a protective aluminum pad upon at least one side of the filter plate. By providing a protective aluminum pad at least on the upstream or inlet side of the carbon filter, any oxide film formed on the pad during exposure to the atmosphere and during any heating preliminary to starting the filtering operation does not obstruct the flow of metal when filtering begins as would be the case if no pad were provided. As a result the pores of the filter are not bridged by the oxide film at the outset of the filtering operation since a layer of aluminum initially exists between the oxide film and the impregnated pores of the filter. When the pad is melted and placed in contact with a body of molten metal to be filtered the oxide film is washed away and disintegrated. Also, the impregnation overcomes the resistance to penetration and wetting by the molten aluminum, presumably because of air entrapped in the interstices and pores of the carbon plate. In this manner, high flow rates have been achieved while obtaining substantially complete removal of the finely-divided non-metallic solids, thus permitting utilization of porous carbon filter plates for commercial filtration of aluminum.

During operation of the filter, it is also essential that the portion of the carbon filter exposed to the flow of metal be maintained out of contact with air, or any other oxidizing atmosphere. This prevents oxidation of metal within the pores of the carbon plate which would clog the filter, and thus enables the filter plate to perform its function with maximum efficiency. The problem is solved simply by providing a filter chamber wherein the body of molten metal to be filtered and in contact with the filter plate is maintained at a level above that portion of the carbon filter plate which comes in contact with the molten metal so that at least the intake surface portion of the carbon filter is entirely submerged in molten metal during the filtering operation. To accomplish this an enclosed chamber is preferably employed, the filter plate serving as a partition to divide the chamber in two portions or sides, one being the inlet or intake side and the other the outlet or discharge side.

For a more detailed explanation of the method of the present invention, reference is made to the attached drawing wherein there is illustrated a device suitable for insertion in a molten metal transfer system or in a pouring spout assembly. The filter apparatus 2 is constructed in two sections which are bolted together at the flanges 4 and retain therein in a suitable circular groove 5 a circular porous carbon filter plate 6 which divides the internal filtering chamber into two portions. The apparatus 2 with its overflow-type metal outlet 10 is so constructed that the molten metal level is maintained at least above the top of the exposed portion of the carbon filter plate 6 on the intake side. Metal flowing into the filter chamber through the metal inlet 8 must pass through the porous carbon filter plate 6 and be discharged through the metal outlet 10. As is evident, this simple unit may be readily disassembled to permit changing of the filter plate 6 or cleaning of the entire assembly.

In FIG. 3 an impregnated porous carbon filter plate 6 is shown with a protective aluminum pad 12 cast upon both sides. A marginal or bearing area 13 should be provided adjacent the periphery of this filter plate which is not covered by the pads 12 in order to permit fitting and clamping the plate in groove 5.

To place the filtering chamber into operation, the unit is preheated to a temperature below the melting or liquidus point of the protective aluminum pad, but sufficiently high to ensure that the metal subsequently introduced into the chamber will be able to raise the temperature of the filter plate to above the melting or liquidus point of the metal, and to about the temperature of the metal being filtered. Generally, electric or gas heaters can be used to heat the filter chamber and filter plate to a temperature of not less than about 1000° F. and preferably above 1100° F., after which molten metal is introduced into the inlet side of the filter chamber to submerge the filter plate and melt the protective aluminum pad and impregnant. After the pad and impregnant have been melted, the molten metal begins to pass therethrough. Once flow has started, additional molten aluminum feeds into the inlet from the metal transfer line, passes through the porous filter plate into the discharge side of the filter chamber from where it passes on to a mold, ladle or other metal receiving device.

It is also desirable to heat the filter chamber during the filtration operation to prevent chilling of the molten metal, preferably at a temperature between about 1200 and 1400° F. This may conveniently be accomplished by the same electric or gas heaters which are initially used to preheat the filter chamber.

The porous carbon plates utilized should have a pore diameter of about .002 to .012 inch, averaging about .005 inch. The thickness of the plates may vary but must in any case be thick enough to withstand the metal pressure without fracture, a plate between ¼ and 2 inches in thickness being preferred. The porous plates may consist of carbon, graphite or a mixture thereof but they must in any case possess a high degree of porosity and permeability. Suitable plates may be made from the carbon products identified by the National Carbon Company as "Porous Carbon" or "Porous Graphite," a graphitized form of "Porous Carbon."

The actual filtering area and thickness of the filter plate will determine the rate of metal flow through the apparatus, subject, of course, to the pressures exerted by the molten metal head. With a 10-inch hydrostatic metal head, and through a ⅜ inch thick carbon plate, flow rates of about 2 to 4 pounds of metal per minute per square inch of filtering area are obtained. Of course, the metal flow can be increased by increasing the height of the metal head or by applying an external pressure to the body of metal being filtered.

To prepare carbon filter plates for service, it is preferred to utilize a mold in which the filter plate is inserted. Aluminum is introduced to impregnate the carbon filter and enough space is provided between the face of the plate and the mold wall to allow formation of the protective aluminum pad upon the surface when the metal solidifies. In practice, an open top metal mold designed to provide the contours of the filter-pad unit illustrated in FIG. 3 is utilized. The mold should be made of a ferrous metal or some other metal having a higher melting point than aluminum and is substantially unaffected by contact with molten aluminum. The carbon filter is mounted in a fixed position in the mold and the entire assembly submerged in a crucible of molten aluminum which is placed in the chamber of a vacuum melting furnace. The pressure within the furnace is initially reduced to about 3 to 10 mm. of mercury and the crucible held therein for a sufficient period of time to permit escape of air from the filter plate. At the conclusion of the holding period the pressure is restored at atmospheric pressure and the metal is thus forced into the pores and passages in the porous carbon plate. Upon removal of the crucible from the furnace the mold assembly is lifted from the molten metal bath and allowed to cool so that the metal solidifies in the space between the carbon filter and mold walls, as well as in the pores. The aluminum in the pads is thus integral with the aluminum impregnant in the pores, i.e. there is continuity between them, so that the existence of any intervening oxide film is precluded. Pads may be cast on one or both faces of the filter plate, and should be about ¼ to ⅜ inch in thickness. The surfaces of the pads are generally machined to a thickness of about 1/16 inch, but not less than about 1/32 inch, and any metal deposited upon the bearing surface of the carbon filter pad is also removed before use to permit a tight seal around the edges of the filter plate.

It is obvious to those skilled in the art that other methods of impregnating the filter may be utilized. For example, it is also possible to impregnate the filter by use of superatmospheric pressure, but this method has been less desirable because the molten metal tends to selectively penetrate or channel through the porous carbon filter plate.

Commercial purity aluminum is generally used as the impregnating agent, although any suitable alloy may be employed. It is desirable, however, that the melting or liquidus point be below the temperature of the metal being filtered.

In accordance with this invention apparatus substantially as shown in the attached drawing was inserted in the transfer line of the casting equipment and an alloy nominally composed of aluminum, 0.6 percent copper, 0.20 percent manganese, 3.3 percent magnesium, 4.3 percent zinc, 0.18 percent chromium and 0.06 percent titanium was filtered therethrough. A ⅜" thick, 7¼" diameter plate of National Carbon Company No. 20 grade porous carbon was placed in an open top ferrous metal mold designed to provide aluminum pads about ⅜ inch thick and 6¼ inches in diameter on the filtering surface of the porous carbon plate while maintaining the bearing area substantially free from metal. The mold was immersed in a crucible containing commercially pure aluminum, which was placed in the chamber of a vacuum melting furnace and the pressure was reduced to about 5 mm. of mercury and held for 5 minutes. Following this period, atmospheric pressure was restored and molten aluminum was forced into the pores of the carbon filter. The mold with filter plate therein was withdrawn from the crucible and cooled to room temperature. The impregnated filter plate with its integral protective aluminum pads was then removed from the mold. The pad surfaces were machined to a thickness of 1/16 inch and the bearing surfaces were cleaned.

The filter plate was placed in the filter apparatus which was then preheated to 1150° F. by electrical heaters after which an initial charge of molten aluminum at about 1500° F. was poured into the apparatus to facilitate melting of the aluminum pads and impregnant. The flow of molten aluminum through the apparatus was at a rate of 63 pounds per minute with a 10 inch head of molten metal. The temperature of the filter chamber was maintained at about 1300° F. with the aid of the electric heaters. The apparatus was used to cast a 24 inch square ingot by the semi-continuous direct chill casting method. A slice was removed from the ingot, upset to about 80 percent, and several specimens were taken therefrom. These specimens were fractured, deeply etched in an aqueous solution of 10% sodium hydroxide, and subjected to microscopic examination, which revealed no evidence of occluded solids. The upsetting of the slice generally magnifies any occluded solids.

As is evident from the foregoing description, the method of the present invention makes it possible to use porous carbon filters for the treatment of molten aluminum at flow rates that are sufficiently high to be suitable for commercial casting practice. The apparatus needed is relatively simple and the results highly desirable.

Having thus described the invention, I claim:

1. In the filtration of molten aluminum, the method comprising: providing a porous carbon filter plate impregnated with aluminum and having a protective aluminum pad upon at least one surface thereof; providing a filtering chamber adapted to be partitioned by said filter plate and to maintain the exposed surface on the intake side of the said filter plate below the level of the molten aluminum passing therethrough; inserting said impregnated filter plate with at least one protective pad thereon in said filtering chamber with an aluminum pad facing the inlet side of said filter chamber; preheating said filtering chamber and impregnated filter to a temperature above 1000° F. but below the melting point of the said aluminum pad and impregnant in said carbon filter plate; introducing molten aluminum into said filtering chamber to melt the said aluminum pad and impregnant; and thereafter passing molten aluminum through the said carbon filter plate, the surface portion of said carbon filter plate exposed to the molten metal being maintained below the level of said molten aluminum.

2. The method in accordance with claim 1 wherein the porous carbon filter plate has protective aluminum pads on both surfaces.

3. In the filtration of molten aluminum through a porous carbon filter plate, the method comprising: impregnating a carbon filter with aluminum and immediately thereafter casting a protective aluminum pad upon at least one surface thereof.

4. The method in accordance with claim 3 wherein protective aluminum pads are cast upon both surfaces of the porous carbon filter plate.

5. A porous carbon filter plate impregnated throughout with aluminum and having an aluminum pad upon at least one surface thereof, the aluminum of said pad being integral with the said aluminum impregnant.

6. In the filtration of molten aluminum, the method comprising: providing a filter chamber adapted to be partitioned by a porous carbon filter plate and having a metal inlet and a metal outlet, said outlet being above the level of the exposed portion of a porous carbon filter plate inserted therein; providing a porous carbon filter plate impregnated with aluminum and having a protective aluminum pad upon at least one surface thereof; inserting said filter plate with at least one protective pad thereon in said filter chamber with an aluminum pad facing the inlet side of said filter chamber; preheating the filter chamber and carbon filter to a temperature above 1100° F. but below the melting point of the said aluminum pad and impregnant; introducing molten aluminum into said metal inlet at a temperature sufficiently high to melt the said aluminum pad and impregnant; and thereafter passing molten aluminum through the said carbon filter for discharge through the said outlet, the exposed surface of said carbon filter plate exposed to the molten metal being maintained below the level of the molten metal.

References Cited in the file of this patent

UNITED STATES PATENTS

| | | |
|---|---|---|
| 1,148,189 | Perris | July 27, 1915 |
| 1,162,244 | Kitsee | Nov. 30, 1915 |
| 1,820,141 | Jessup | Aug. 25, 1931 |
| 1,856,475 | Frost | May 3, 1932 |
| 1,918,893 | Beckmann | July 18, 1933 |
| 2,863,558 | Brondyke | Dec. 9, 1958 |

FOREIGN PATENTS

| | | |
|---|---|---|
| 155,903 | Austria | Apr. 11, 1939 |
| 1,040,447 | France | May 20, 1953 |